US011403427B2

(12) United States Patent
Potteiger et al.

(10) Patent No.: US 11,403,427 B2
(45) Date of Patent: Aug. 2, 2022

(54) METHODS AND SYSTEMS FOR REINFORCEMENT LEARNING OF POST-ATTACK SECURITY HARDENING PASSES

(71) Applicant: Arms Cyber Defense, Inc., Franklin, TN (US)

(72) Inventors: Timothy Potteiger, Baltimore, MD (US); Bradley Potteiger, Baltimore, MD (US); Michael Bryant, Brentwood, TN (US)

(73) Assignee: Arms Cyber Defense, Inc., Franklin, TN (US)

( * ) Notice: Subject to any disclaimer, the term of this patent is extended or adjusted under 35 U.S.C. 154(b) by 184 days.

(21) Appl. No.: 17/028,949

(22) Filed: Sep. 22, 2020

(65) Prior Publication Data

US 2022/0083677 A1 Mar. 17, 2022

Related U.S. Application Data

(60) Provisional application No. 63/077,471, filed on Sep. 11, 2020.

(51) Int. Cl.
*G06F 21/62* (2013.01)
*G06F 11/34* (2006.01)

(52) U.S. Cl.
CPC ........ *G06F 21/629* (2013.01); *G06F 11/3428* (2013.01)

(58) Field of Classification Search
CPC ........................... G06F 21/629; G06F 11/3428
(Continued)

(56) References Cited

U.S. PATENT DOCUMENTS 11,216,265 B1 * 1/2022 Hornbeck ............. G06F 9/5072
2014/0095883 A1 * 4/2014 Kirillov ................ H04L 9/0891
713/176
(Continued)

FOREIGN PATENT DOCUMENTS

CN   102184360 A  *  9/2011
CN   109729180 A  *  5/2019   ............. G06Q 50/26
(Continued)

OTHER PUBLICATIONS

Rose et al., "System Hardening for Infrastructure as a Service (IaaS)," 2020 IEEE Systems Security Symposium (SSS), 2020, pp. 1-7, doi: 10.1109/SSS47320.2020.9174202. (Year: 2020).*
(Continued)

*Primary Examiner* — Peter C Shaw
(74) *Attorney, Agent, or Firm* — Cognition IP, P.C.; Edward Steakley (57) ABSTRACT

Various embodiments of methods, systems and computer program products described herein are directed to a Security Engine. The Security Engine provides for post-attack security upgrades of an application by selecting specific security hardening passes to be applied to a pre-attack state of the application. According to various embodiments, the Security Engine receives a pre-attack state of a first instance of an application in response to an action by an attack source. The Security Engine selects one or more security hardening passes to be applied to the pre-attack state. The Security Engine sends an identification of the selected security hardening passes to be applied to a second instance of the application running at the pre-attack state.

17 Claims, 8 Drawing Sheets

(58) Field of Classification Search
USPC .......................................................... 726/29
See application file for complete search history.

(56) References Cited

U.S. PATENT DOCUMENTS

| | | | | |
|---|---|---|---|---|
| 2019/0068640 A1* | 2/2019 | Araujo | ..................... | G06F 21/53 |
| 2021/0026949 A1* | 1/2021 | Korotaev | ................. | G06F 8/656 |
| 2021/0075794 A1* | 3/2021 | Gazit | .................. | H04L 63/1408 |
| 2021/0126779 A1* | 4/2021 | Barraza Enciso | .... | H04L 9/3239 |
| 2021/0306340 A1* | 9/2021 | Wade | .................. | H04L 41/0836 |

FOREIGN PATENT DOCUMENTS

| | | | | |
|---|---|---|---|---|
| CN | 112559983 A | * | 3/2021 | |
| EP | 3885951 A1 | * | 9/2021 | .............. G06F 11/00 |
| GA | 2626993 A1 | * | 5/2007 | .......... G06F 11/0718 |

OTHER PUBLICATIONS

Stuckman et al., "A testbed for the evaluation of web intrusion prevention systems," 2011 Third International Workshop on Security Measurements and Metrics, 2011, pp. 66-75, doi: 10.1109/Metrisec.2011.14. (Year: 2011).*

Alomari et al., "An Autonomic Framework for Integrating Security and Quality of Service Support in Databases," 2012 IEEE Sixth International Conference on Software Security and Reliability, 2012, pp. 51-60, doi: 10.1109/SERE.2012.15. (Year: 2012).*

Vasileios et al., "Interoperability of security and quality of Service Policies Over Tactical SOA," 2016 IEEE Symposium Series on Computational Intelligence (SSCI), 2016, pp. 1-7, doi: 10.1109/SSCI.2016.7850077. (Year: 2016).*

Carelli et al., "Performance Monitor Counters: Interplay Between Safety and Security in Complex Cyber-Physical Systems," in IEEE Transactions on Device and Materials Reliability, vol. 19, No. 1, pp. 73-83, Mar. 2019, doi: 10.1109/TDMR.2019.2898882. (Year: 2019).*

* cited by examiner

Example Reward function (R):

Performance speedup threshold (Speedup$_{thres}$) = 30%

Security(state) = $\sum$( weight(attack$_k$)*is_prevented(attack$_k$,state) )

Speedup(state) = $\sum$( weight(test$_k$)*(time(test$_k$)-time(state$_k$))/time(state$_k$) )

R(state) = (Speedup(state) - Speedup$_{thres}$)*e^(security(state))*(Speedup$_{thres}$ - Speedup(state)))

Rationale: Once speedup exceeds threshold, reward is negative. In this case, larger security values reduce the negative value of the reward. In general with positive values, reward is exponential with respect to security value and difference between threshold and speedup.

METHODS AND SYSTEMS FOR REINFORCEMENT LEARNING OF POST-ATTACK SECURITY HARDENING PASSES

CROSS-REFERENCE TO RELATED APPLICATIONS

This application claims the benefit of U.S. Provisional Patent Application No. 63/077,471, filed Sep. 11, 2020, which is hereby incorporated by reference in its entirety.

BACKGROUND

There are various types of ransomware attacks. In a "file-based attack," an end-user may receive a file and then access the file. Such access of the file triggers execution of harmful software within the file that interferes with the operations of the end-user's computer system. In some cases, the harmful software introduced via the file may lock down the computer system rendering it completely unusable by the end-user. In a "file-less" attack, harmful software may probe be sent to a computer system to take advantage of buffer overflows and memory corruption vulnerabilities in order to insert harmful software into the computer system. Conventional ransomware security upgrades for software applications currently exist where end-users are offered a choice between adding security features or opting out of the offered security upgrade entirely.

SUMMARY

Conventional techniques for applying security features to an application result in a degradation of the application's performance. Such security features are applied to the application prior to occurrence of an attack (or security threat). For example, security features may be applied to the entirety of the application's source code since the type of a future potential attack is unknown. Therefore, the applied security features are broad in scope and effect various measures of the application's performance and efficiency. However, an actual attack of the application may only effect certain aspects of the application's performance which indicates that the conventional techniques apply more security features than is necessary. As such, conventional techniques do not apply security features at a granular level with respect to specific performance measures so as to control the performance trade-offs that inevitably occur when adding security functionality to an application.

Various embodiments of methods, systems and computer program products described herein are directed to a Security Engine. The Security Engine selects post-attack security upgrades of an application by selecting specific security hardening passes to be applied to a pre-attack state of the application. According to various embodiments, the Security Engine receives a pre-attack state of a first instance of an application in response to an action by an attack source. The Security Engine selects one or more security hardening passes to be applied to the pre-attack state. The Security Engine sends an identification of the selected security hardening passes to be applied to a second instance of the application running at the pre-attack state.

According to various embodiments, the Security Engine implements a reinforcement learning algorithm to determine which types of security hardening passes are to be applied— and in what order—to an application in order to secure the vulnerabilities of an application that were already exploited by an attack source.

According to various embodiments, a parent process runs processes of the same application at a computer device that is separate from the Security Engine. For example, the Security Engine may be a service implemented via a cloud computing platform that communicates with the computer device. The parent process detects an attack on a first process of the application. The parent process runs an idle second process of the application running at a pre-attack state of the application. The parent process sends the pre-attack state (i.e. a stack trace) to the Security Engine. The Security Engine selects a sequence of hardening security passes, according to the reinforcement learning algorithm, that balances modifying the application with security features that directly address the threat posed by the detected attack with maintaining optimal application performance.

The Security Engine sends the selected sequence of hardening security passes to the parent process to be applied to the idle second process by the parent process. The idle second process consists of the application running at the pre-attack state and the parent process updates the idle second process with the selected sequence of hardening security passes while the attacked first process fails (i.e. crashes) due to the attack.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present disclosure will become better understood from the detailed description and the drawings, wherein.

DETAILED DESCRIPTION

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

Figure 1:
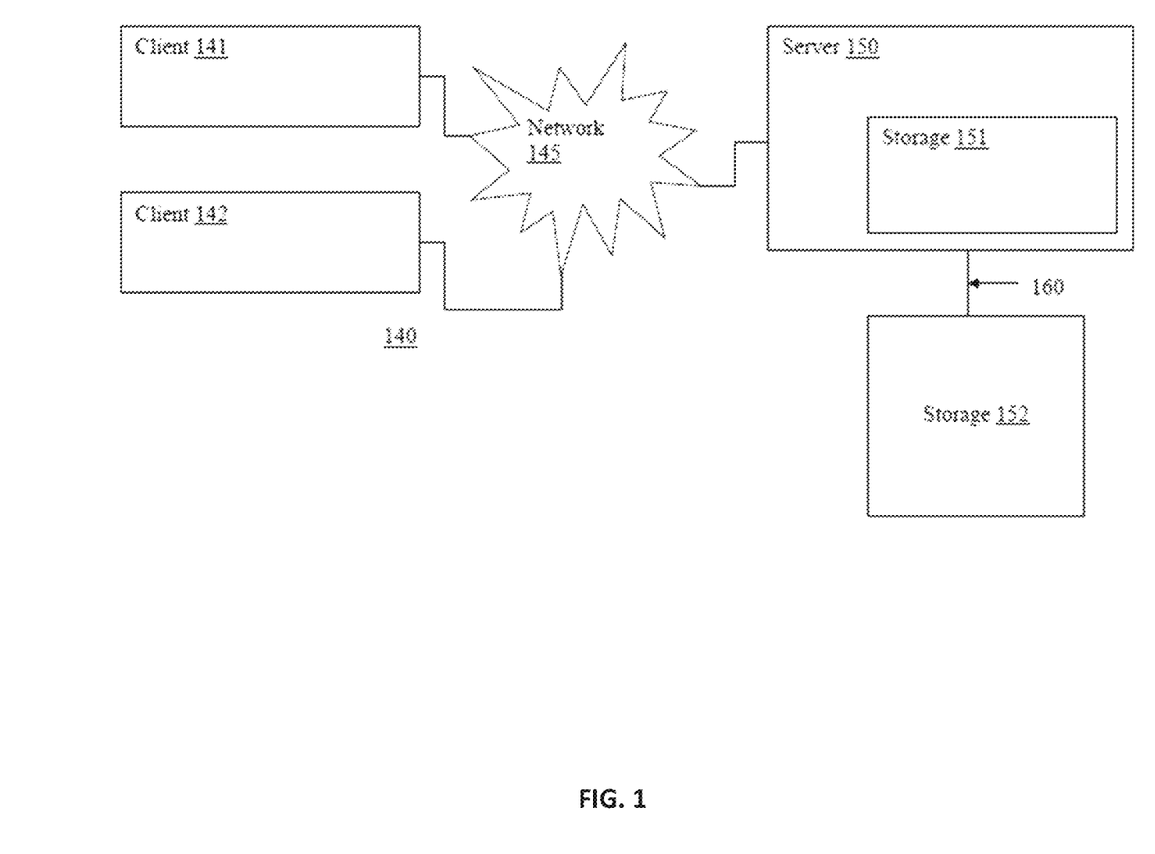
FIG. 1 is a diagram illustrating an exemplary environment in which some embodiments may operate.

FIG. 1 illustrates an exemplary network environment in which embodiments may operate. In the exemplary environment 140, two clients 141, 142 are connected over a network 145 to a server 150 having local storage 151. Clients and servers in this environment may be computers. Server 150 may be configured to handle requests from clients. Server 150 may be implemented as a number of networked server devices, though it is illustrated as a single entity. Communications and transmissions between a base station and one or vehicles and between a base station and one or more control centers as described herein may be executed similarly as the client 141, 142 requests.

The exemplary environment 140 is illustrated with only two clients and one server for simplicity, though in practice there may be more or fewer clients and servers. The computers have been termed clients and servers, though clients can also play the role of servers and servers can also play the role of clients. In some embodiments, the clients 141, 142 may communicate with each other as well as the servers. Also, the server 150 may communicate with other servers.

The network 145 may be, for example, local area network (LAN), wide area network (WAN), telephone networks, wireless networks, intranets, the Internet, or combinations of networks. The server 150 may be connected to storage 152 over a connection medium 160, which may be a bus, crossbar, network, or other interconnect. Storage 152 may be implemented as a network of multiple storage devices, though it is illustrated as a single entity. Storage 152 may be a file system, disk, database, or other storage.

In an embodiment, the client 141 may perform the method 200 or other method herein and, as a result, store a file in the storage 152. This may be accomplished via communication over the network 145 between the client 141 and server 150. For example, the client may communicate a request to the server 150 to store a file with a specified name in the storage 152. The server 150 may respond to the request and store the file with the specified name in the storage 152. The file to be saved may exist on the client 141 or may already exist in the server's local storage 151.

In another embodiment, the client 141 may be a vehicle that sends vehicle sensor data used during execution of the method 200 or other method herein. This may be accomplished via communication over the network 145 between the client 141 and server 150. For example, the client may communicate a request to the server 150 to store a file with a specified file name in the storage 151. The server 150 may respond to the request and store the file with the specified name in the storage 151. The file to be saved may exist on the client 141 or may exist in other storage accessible via the network such as storage 152, or even in storage on the client 142 (e.g., in a peer-to-peer system).

In accordance with the above discussion, embodiments can be used to store a file on local storage such as a disk or on a removable medium like a flash drive, CD-R, or DVD-R. Furthermore, embodiments may be used to store a file on an external storage device connected to a computer over a connection medium such as a bus, crossbar, network, or other interconnect. In addition, embodiments can be used to store a file on a remote server or on a storage device accessible to the remote server.

Furthermore, cloud computing is another example where files are often stored on remote servers or remote storage systems. Cloud computing refers to pooled network resources that can be quickly provisioned so as to allow for easy scalability. Cloud computing can be used to provide software-as-a-service, platform-as-a-service, infrastructure-as-a-service, and similar features. In a cloud computing environment, a user may store a file in the "cloud," which means that the file is stored on a remote network resource though the actual hardware storing the file may be opaque to the user.

Figure 2:
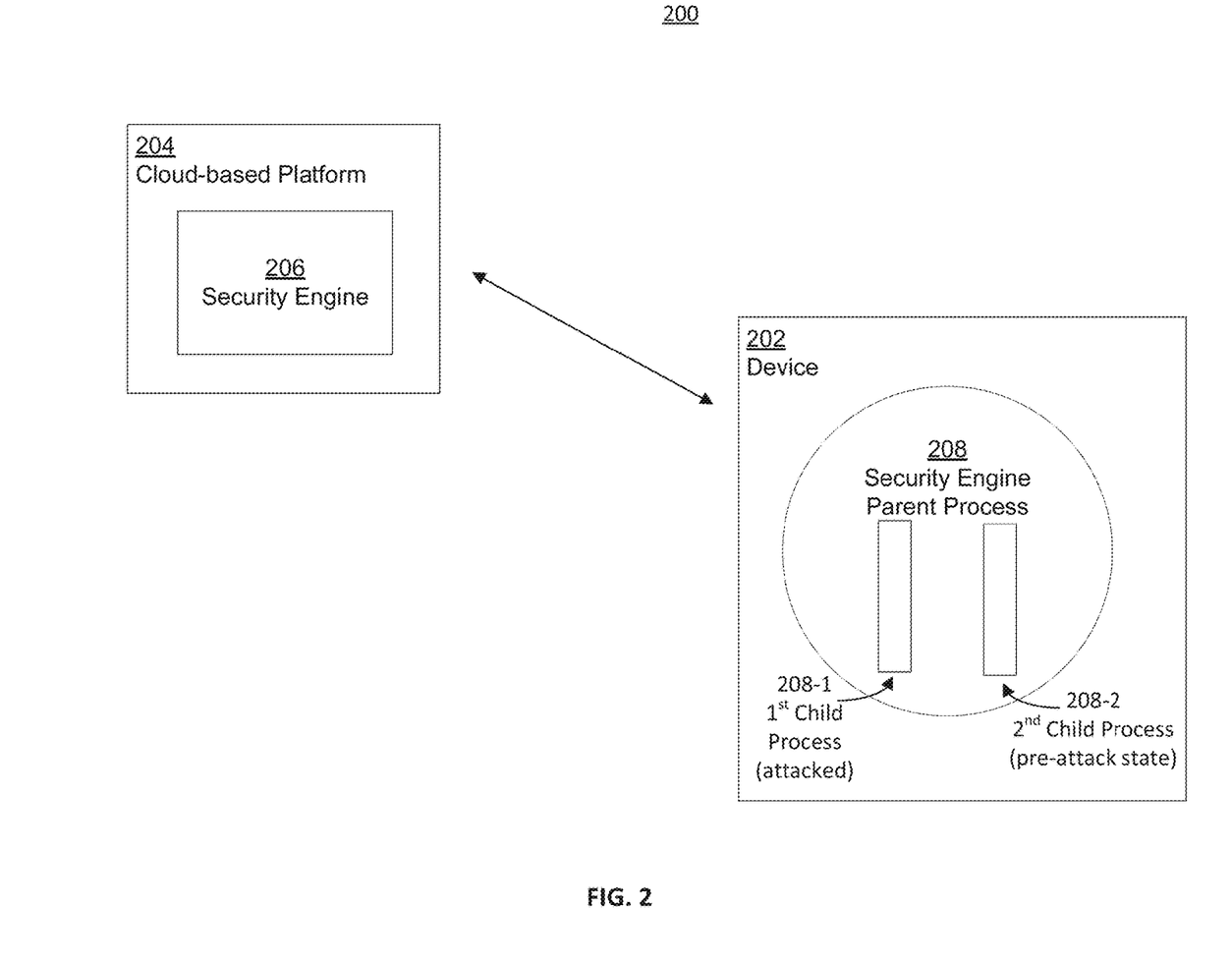
FIG. 2 is a diagram illustrating an exemplary environment in which some embodiments may operate.

As shown in the diagram 200 of FIG. 2, various embodiments of the Security Engine 206 may be implemented according to a cloud-based platform 204. A client 141 may be a device 202, such as a computer device, that communicates with the Security Engine 206. The device 202 may install a software module(s) that executes one or more security engine processes locally on the device 202. For example, when an application is called for execution at the device 202, the application may be initiated and forked by a security engine parent process 208. The called application may run as a first child process 208-1 of the parent process 208. In addition, another instance of the same application may run as a second child process 208-2 of the parent process 208. The parent process 208 monitors the process 208-1, 208-2 for possible security threats, such as a remote source (i.e. a hacker) attempting an attack via a hack of one of the processes 208-1, 208-2 or inserting a computer virus into the application source code via accessing one of the process 208-1, 208-2.

When an attack on the first process 208-1 occurs, a memory access violation may occur and the parent process 208 detects, for example, a SigSegv signal (i.e., a segmentation fault or a segmentation violation) resulting from the memory access violation. A SigSegv signal may occur when a program tries to read/write outside of memory allocated for a program. In other words, a SigSegv signal may occur when a program tries to access memory to which it does not have access to.

The parent process 208 captures a stack trace of the second process that corresponds with a pre-attack state of the first process just prior to the attack. The parent process 208 sends the stack trace to the Security Engine 206. In response to the stack trace, the Security Engine 206 sends one or more security hardening passes to the parent process 208 that are to be applied to the second process 208-2 by the parent process. The first process 208-1 fails (i.e. crashes) as a result of the attack. However, the application is now updated via the second process 208-2 having been modified with the security hardening passes selected by the Security Engine 206.

According to another embodiment, the Security Engine 206 may have a repository of applications, where each application's source code that also includes security engine parent process source code specific to the application. The device 202 may thereby be download and install an application from the repository. When the application is executed, the parent process may be initiated which then further calls initiation of running instances of the same application on multiple, separate processes.

Figure 3:
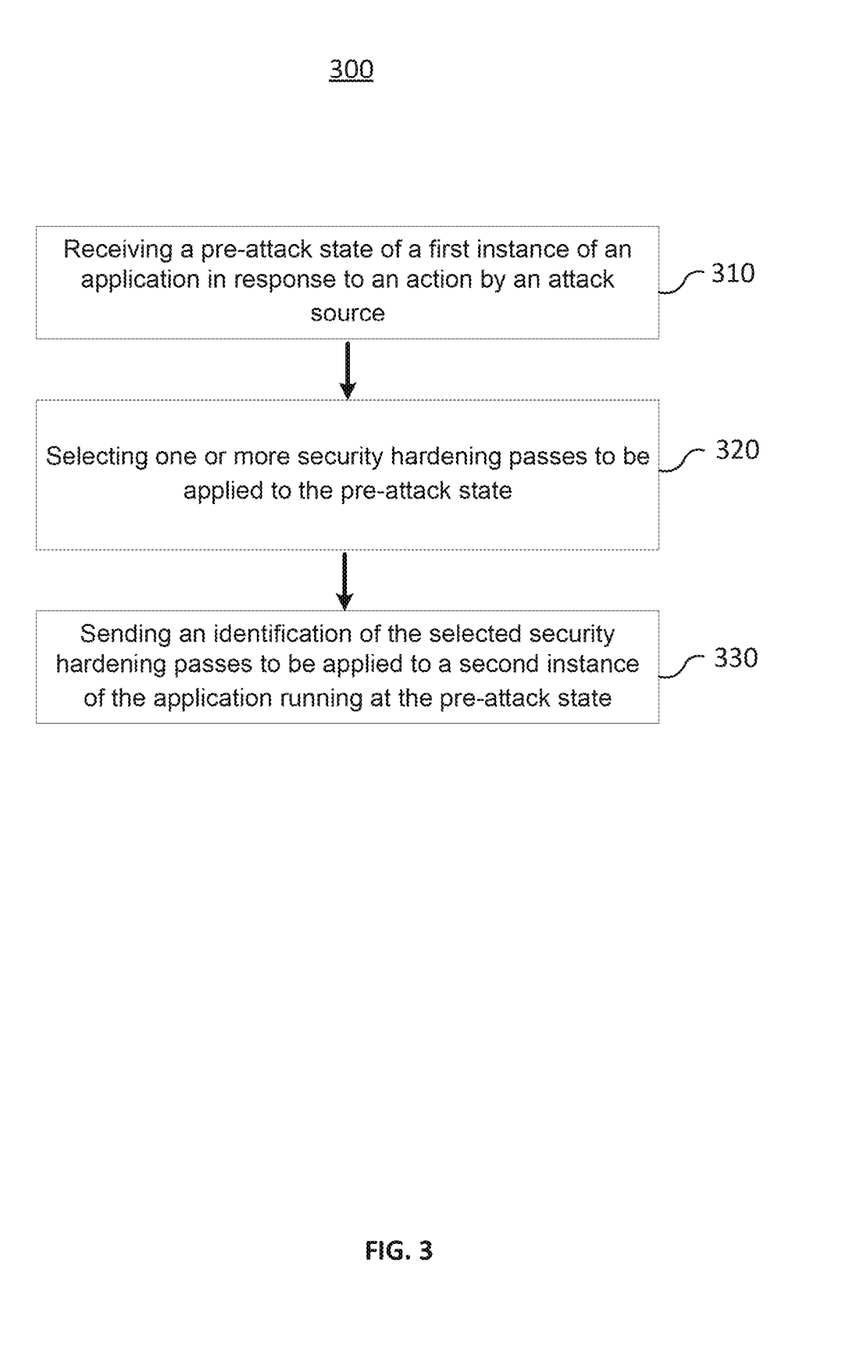
FIG. 3 is a diagram illustrating an exemplary method that may be performed in some embodiments.

As shown flowchart 300 in FIG. 3, the Security Engine receives a pre-attack state of a first instance of an application in response to an action by an attack source (Act 310). For example, the Security Engine receives an indication of a detected memory access violation of memory used by a first process for the first instance of the application. The indication of the detected memory access violation of diversified memory used by the first process. In various embodiments, the memory access violation may be detected by a parent process of the first process where the parent process diversified the memory used by the first process prior to the detected memory access violation. For example, the parent process may identify sections of memory for the application and apply one or more memory diversification techniques.

The Security Engine selects one or more security hardening passes to be applied to the pre-attack state (Act 320). For example, the Security Engine implements a reinforcement learning model in order to identify and select one or more security hardening passes. The reinforcement learning model ensures that, as each security hardening pass is identified, that applying the respective security hardening pass to a stack trace of the application that represents the application's pre-attack state will maintain a threshold level of performance according to various performance measures. According to various embodiments, the Security Engine selects a first security hardening pass associated with a first type of program efficiency benchmark and applies the first security hardening pass to the pre-attack state. The pre-attack state may be represented by a stack trace of an instance of a running application that reflects the application's state just prior to an attack from an unauthorized source. The Security Engine validates whether the pre-attack state with the applied first security hardening pass satisfies a first application performance threshold that corresponds with the first type of program efficiency benchmark.

Based on satisfying the first application performance threshold, the Security Engine selects the first security hardening pass to be included in a particular sequence of security hardening passes that may be applied to the application. In addition, the Security Engine selects a second security hardening pass associated with a second type of program efficiency benchmark. It is understood that the second type of program efficiency benchmark is different than the first type of program efficiency benchmark. The Security Engine applies the second security hardening pass to the pre-attack state as modified by the first security hardening pass. The Security Engine validates whether the pre-attack state as modified with the first and second security hardening passes satisfies a second application performance threshold that corresponds with the first and the second types of program efficiency benchmarks. Based on satisfying the second application performance threshold, the Security Engine selects the second security hardening pass to be included in the particular sequence of security hardening passes that may be applied to the application. It is understood that various embodiments of the Security Engine are not limited to two security hardening passes and any number of security hardening passes may be included in a potential security hardening passes that may be applied to the application (such as, for example, the application running at the pre-attack state as represented by a stack trace).

The Security Engine sends an identification of the selecting security hardening passes to be applied to a second instance of the application running at the pre-attack state (Act 330). For example, the Security Engine sends the identification of the selected security hardening passes to be applied to a second process by the parent process. According to various embodiments, second process is for the second instance of the application, which runs idle at the pre-attack state while the first process fails due to the attack source.

Figure 4:
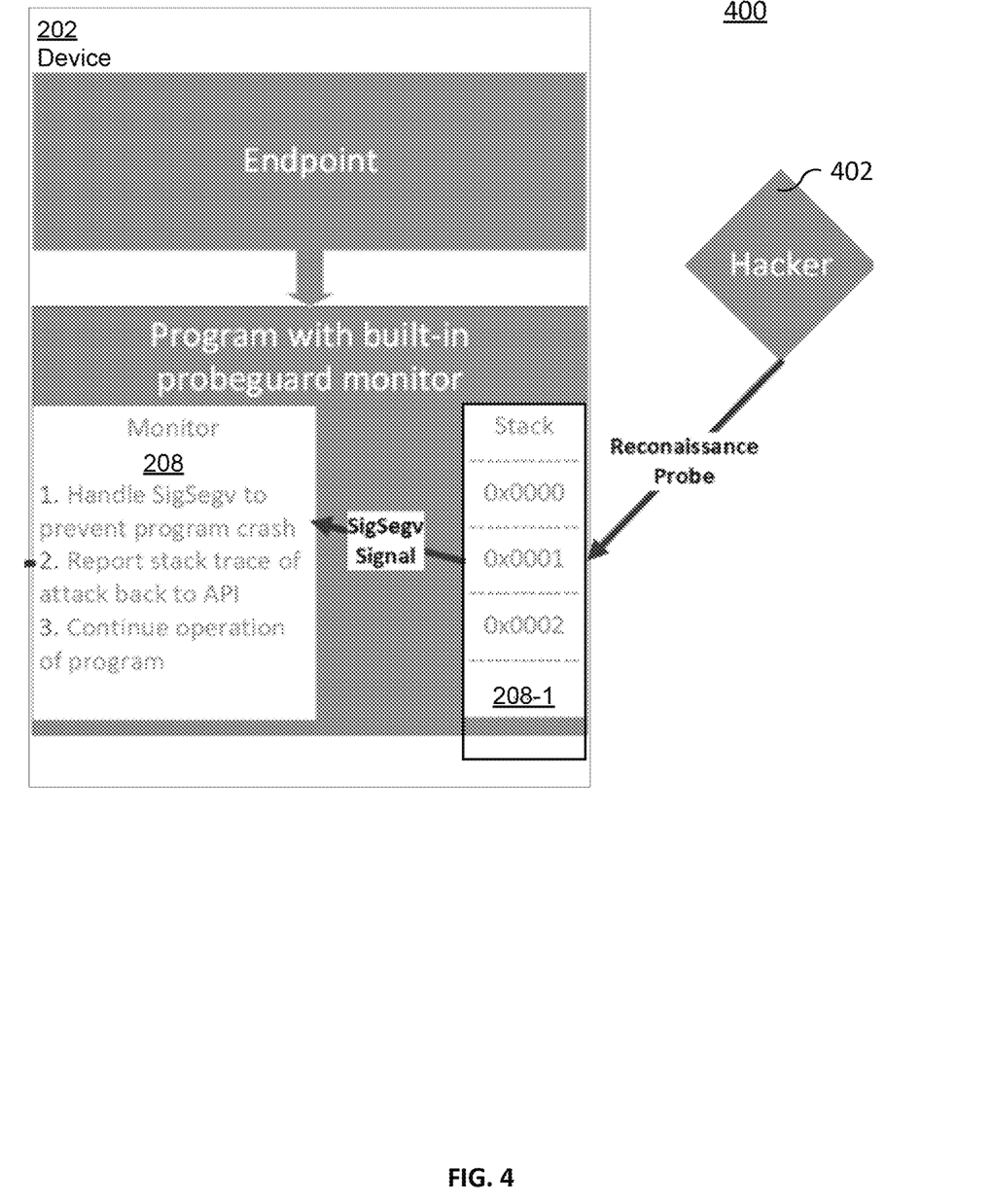
FIG. 4 is a diagram illustrating an exemplary environment in which some embodiments may operate.

As shown in diagram 400 of FIG. 4, an attack source 402, such as a hacker, may send a reconnaissance probe (for a reconnaissance attack) to the first process 208-1, which may trigger a SigSegv signal as a result of a memory access violation. The parent process 208 ("Monitor") detects and intercepts the SigSegv signal. The parent process 208 further captures a stack trace of the first process 208-1 up to a moment in time just prior to the memory access violation. The stack trace represents the pre-attack state of the application running on the first process 208-1. The parent process 208 sends the stack trace to the Security Engine 206 via its API (application programming interface). According to some embodiments, the parent process captures the pre-attack state of the first process 208-1 and sets the second process 208-2 to run idle at the same pre-attack state. The parent process 208 captures the stack trace from the second process 208-2—which represents the pre-attack state of the first process 208-1. The parent process 208 sends the stack trace (captured from the idle second process 208-2) to the Security Engine 206 via its API (application programming interface). The parent process 208 further allows the first process 208-1 to continue execution, which may result in the first process 208-1 failing or crashing as a result of the reconnaissance probe. However, the second process 208-2 remains active.

Figure 5:
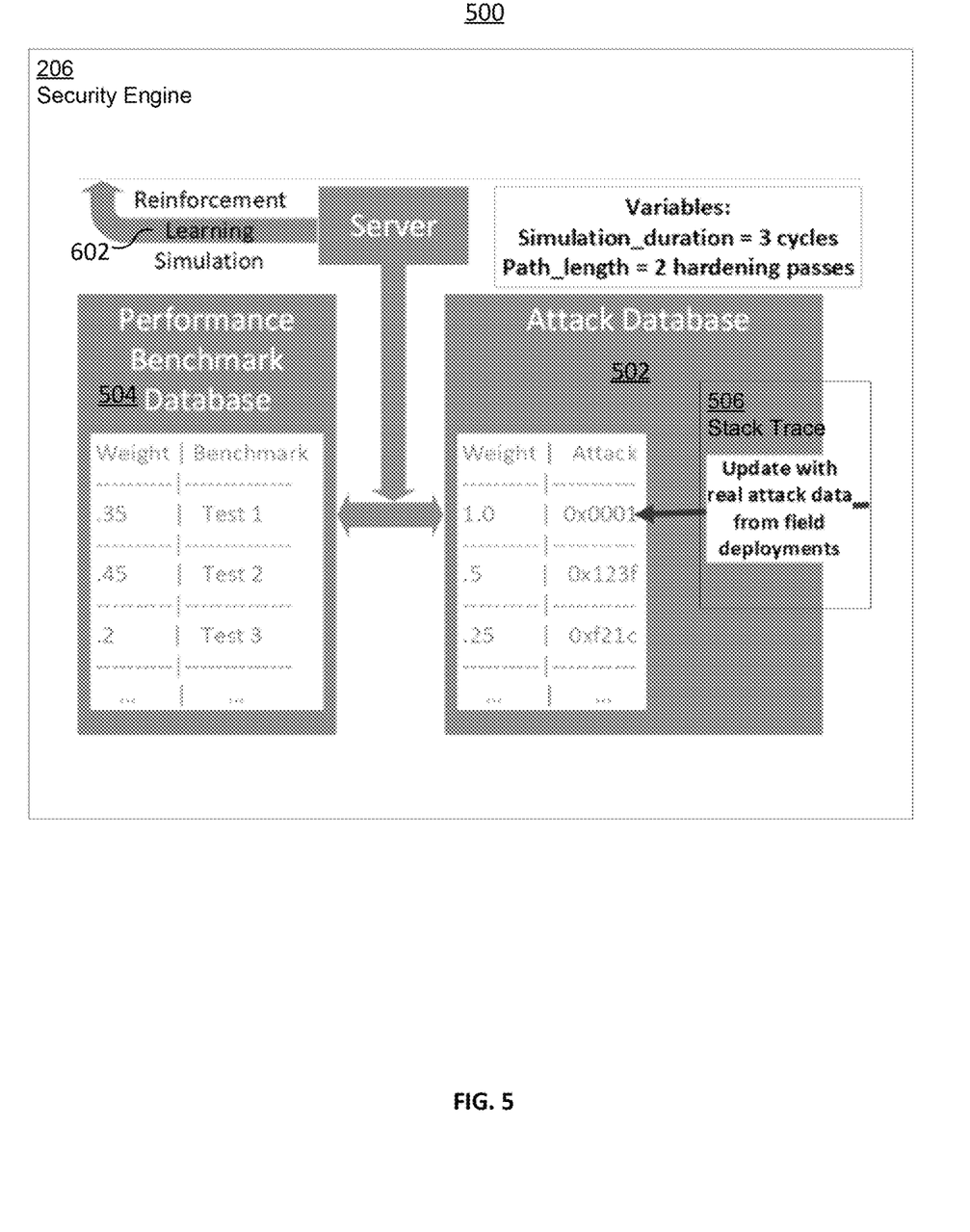
FIG. 5 is a diagram illustrating an exemplary environment in which some embodiments may operate.

As shown in the diagram 500 of FIG. 5, the Security Engine 206 receives a stack trace 506 from the parent process 208 executing on the device 202. The Security Engine 206 stores a record of the stack trace 506 in an attack database 502, which includes records of previous stack traces regarding various different attacks that occurred on other devices. The Security Engine 206 assigns a weight to the record of the stack trace 506 based on a recency of the stack trace 506. For example, if the stack trace 506 is the most recent stack trace received by the Security Engine 206, the corresponding weight may be the largest weight as compared to other weights of records of pervious stack traces stored in the attack database 502.

The Security Engine 206 also includes a performance benchmark database 504. The performance benchmark database 504 includes a plurality of different tests of performance benchmarks. The respective tests may determine (or qualify) the efficiency of an application as successive security hardening passes are applied to the application in order upgrade the application with security features and/or enhancements. For example, various types of performance benchmarks for an application that may be tested include, but are not limited to: detection of security events, connectivity, encryption speed and/or a target range of network bandwidth. Each respective tests of a performance benchmark in the performance benchmark database 504 has a corresponding weight value as well.

Figure 6:
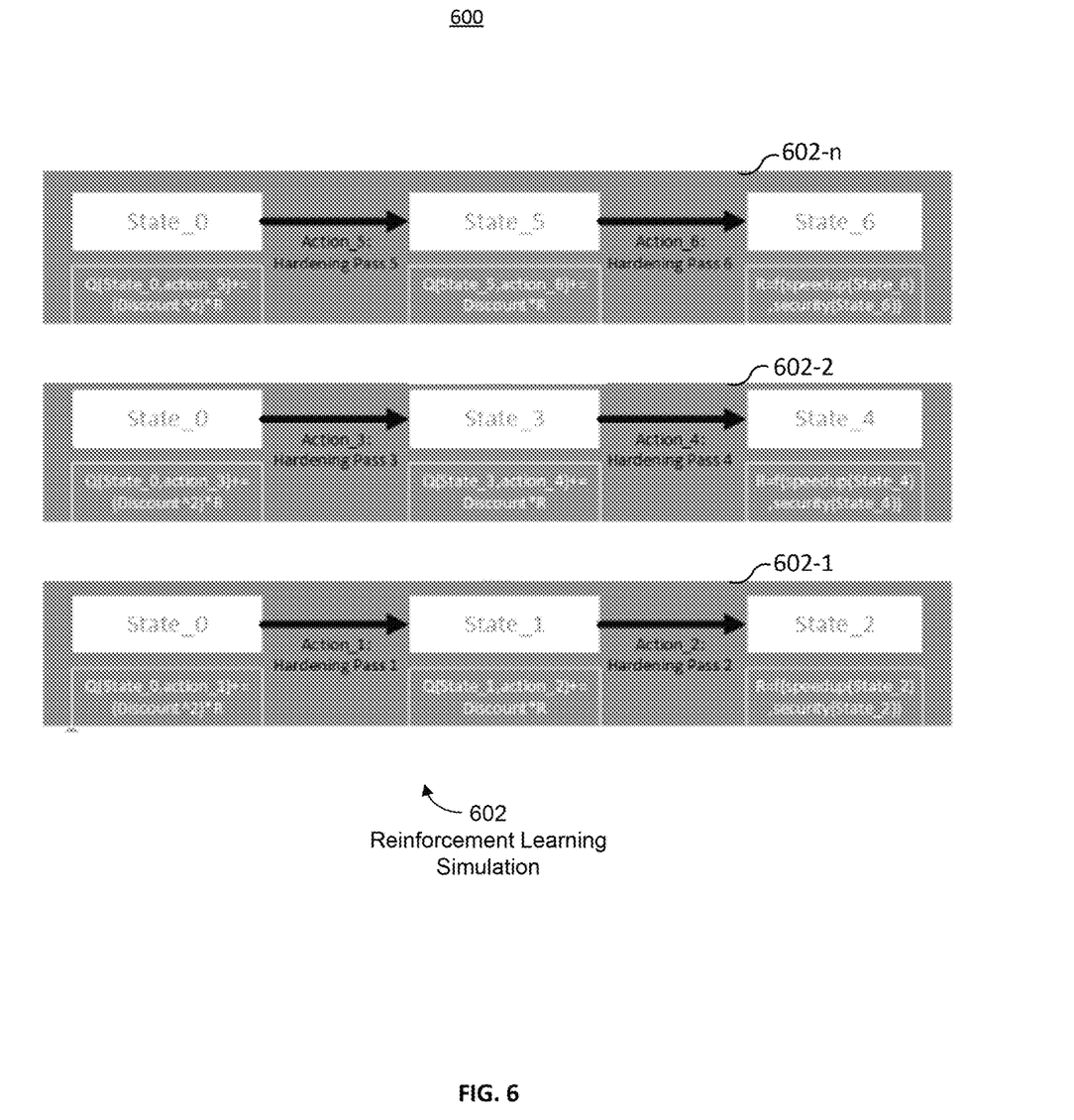
FIG. 6 is a diagram illustrating an exemplary environment in which some embodiments may operate.

As shown in the diagram 600 of FIG. 6, the Security Engine 206 executes a simulation 602 according to the reinforcement learning algorithm in order to identify one or more security hardening passes (and a sequence of implementing those identified security hardening passes) for the application. According to various embodiments, the simulation 602 executes multiple iterations 602-1, 602-2 . . . 602-n. Each respective iteration 602-1, 602-2 . . . 602-n is separate for other iterations. Each iteration 602-1, 602-2 . . . 602-n generates output the includes one or more recommended security hardening passes and a particular order in which the recommended security hardening passes are to be applied. Each security hardening pass includes one or more updates to the source code of an application or including additional source code to the application. The source code updates and the additional source code represent one or more types of security features and/or security enhancements. Each security hardening pass corresponds to a respective test-weight pair stored in the performance benchmark database 504. For example, a first type of security hardening pass corresponds with a first test-weight pair (Test 1, 0.35) and a second type of security hardening pass corresponds with a second test-weight pair (Test 2, 0.45).

According to various embodiments, each iteration 602-1, 602-2 . . . 602-n may begin at the same representation of an application's state. For example, each iteration 602-1, 602-2 . . . 602-n may begin at the application's pre-attack state as represented by the received stack trace 506 ("State 0"). For a particular iteration 602-1, the simulation 602 begins at the application's source code at the pre-attack state ("State 0") and applies a first type of security hardening pass to modify the pre-attack state. The simulation 602 verifies the modified pre-attack state ("State 1") according to a reward function with respect to a first test-weight pair in the performance benchmark database 504 that corresponds with the applied first type of security hardening pass. The reward function qualifies the effect of an applied security hardening pass(es) with regard to the added type of security feature and impact on the application's performance the added security may have.

In various embodiments, the reward function compares a result of a test (from the performance benchmark database 504) as applied to the application with a corresponding security hardening pass to a result of the same test as applied to the application prior to the corresponding security hardening pass. For example, after the reward function verifies the modified pre-attack state ("State 1") satisfies a threshold associated with a test that corresponds with the first type of security hardening pass, the simulation 602 applies a second type of security hardening pass to the modified pre-attack state ("State 1"). As such a subsequent modified pre-attack state ("State 2") represents the pre-attack state ("State 0") as modified by the first and second types of security hardening passes. The iteration 602-1 includes computation of the reward function to verify the subsequent modified pre-attack state ("State 2") satisfies a threshold associated with a test that corresponds with the second type of security hardening pass, the simulation 602 applies a second type of security hardening pass to the modified pre-attack state ("State 1"). For example, the reward function generates a result of a test (which corresponds with the second type of security hardening pass) as applied to the subsequent modified pre-attack state ("State 2") and a result of the same test as applied to modified pre-attack state ("State 1").

It is understood that the various iterations 602-1, 602-2 . . . 602-n may apply different types of security hardening passes and/or may apply similar types of security hardening passes according to a different order. Each iteration 602-1, 602-2 . . . 602-n is complete when a particular threshold for a respective reward function calculation is not met. The simulation 602 therefore outputs a sequence of security hardening passes for each respective 602-1, 602-2 . . . 602-n. The simulation 602 selected a particular output sequence of security hardening passes that represents a modified pre-attack state that has the best performance measures. The Security Engine 206 sends the selected security hardening passes to the parent process 208. The parent process 208 updates the application running idle on the second process 208-1 with the selected security hardening passes.

Each iteration 602-1, 602-2 . . . 602-n of the reinforcement learning simulation 602 may be set to select and perform a pre-defined number of security hardening passes. As shown in FIG. 6, for example, the pre-defined number is 2. At the end of each iteration 602-1, 602-2 . . . 602-n, the resulting state (state 2, state 4, state 6) is evaluated according to a reward function and a particular state is selected from the resulting state (state 2, state 4, state 6) based on its corresponding reward function result.

Figure 7:
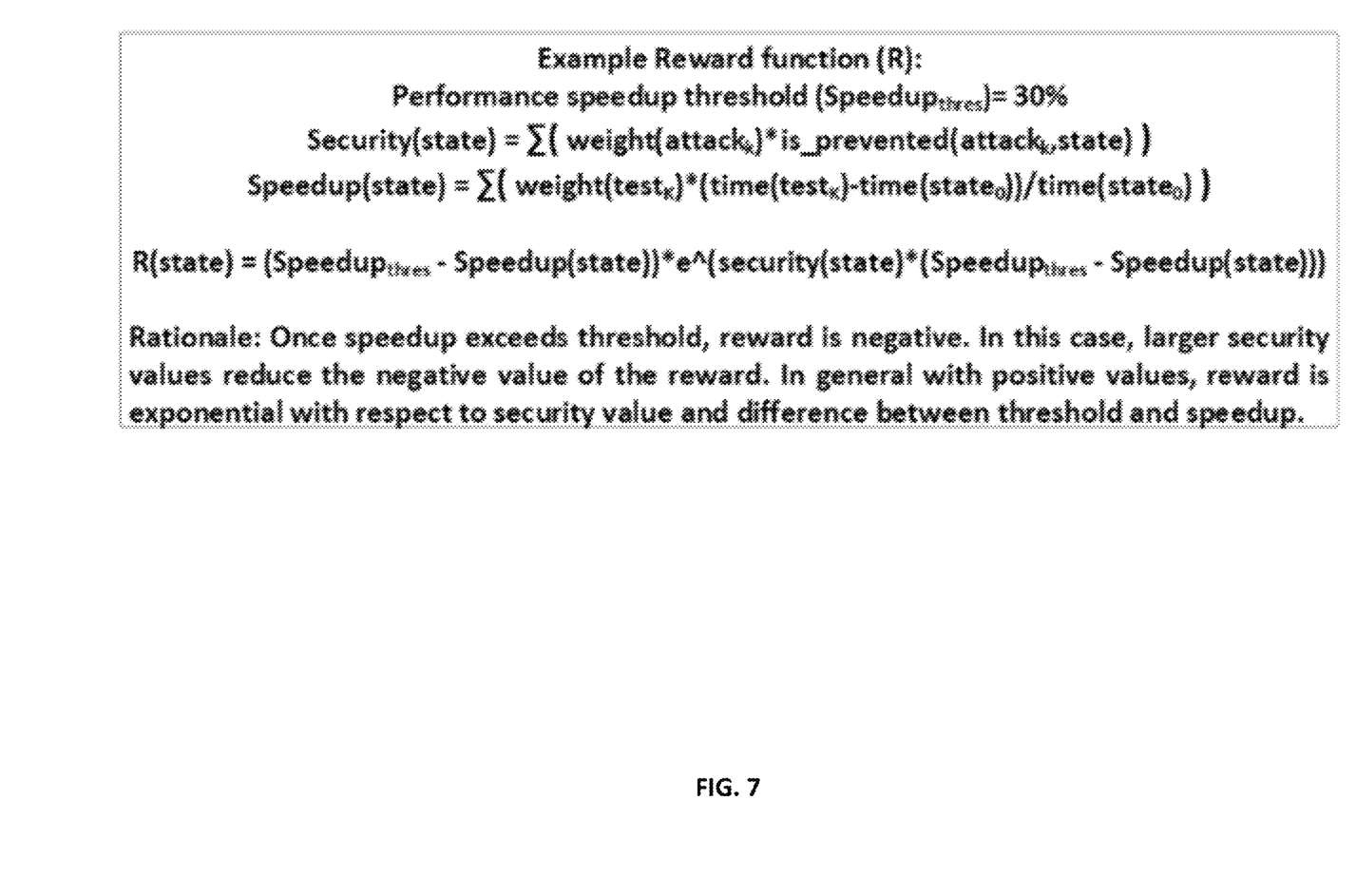
FIG. 7 is a diagram illustrating an exemplary environment in which some embodiments may operate.

As shown in FIG. 7, the reward function ("R(state)") determines the effect one of more security hardening passes applied to a pre-attack state has on securing an application and the application's performance overhead. The "Security (state)" function represents the effectiveness of the security features added to the pre-attack state from each type of security hardening pass used for a resulting state output from a simulation iteration. For example, with respect to a second iteration 602-2, each iteration state (i.e. state 3, state 4) from the second iteration 602-2 will be used for input parameters into the "Security(state)" function. Each type of security hardening pass is modeled to defend from a particular attack(s), as is listed with a corresponding weight in the attack database 502. The "is_prevented(state)" function returns a result indicating whether a particular security hardening pass (or iteration state) effectively protects against a type(s) of attack it is designed to protect against.

The "Speedup(state)" function represents the extent of the application's performance degradation as result of each type of security hardening pass (or iteration state) of the same resulting state output from the simulation iteration. As described above, each test in the benchmark database 504 is associated with a particular type(s) of security hardening pass and each teach further has a corresponding weight. The "Speedup(state)" function accounts for the performance effects from each iteration's state (i.e. state 3 and state 4 from the second iteration 602-2) with respect to the performance of the non-secured pre-attack state. A threshold may be set at 30%, which defines a maximum tolerated performance degradation threshold. Any performance degradation experienced by an iteration's state that exceeds the threshold will result in a negative R(state) value.

It is understood that various machine learning techniques may be used individually, or in combination, during one or more iterations of a simulation. For example, a simulation of one or more iterations to generate output states based on one or more security hardening passes may be based on implementing and executing one or more of the following: a neural net based algorithm, such as Artificial Neural Network, Deep Learning; a robust linear regression algorithm, such as Random Sample Consensus, Huber Regression, or Theil-Sen Estimator; a tree-based algorithm, such as Classification and Regression Tree, Random Forest, Extra Tree, Gradient Boost Machine, or Alternating Model Tree; Naïve Bayes Classifier; and other suitable machine learning algorithms.

Figure 8:
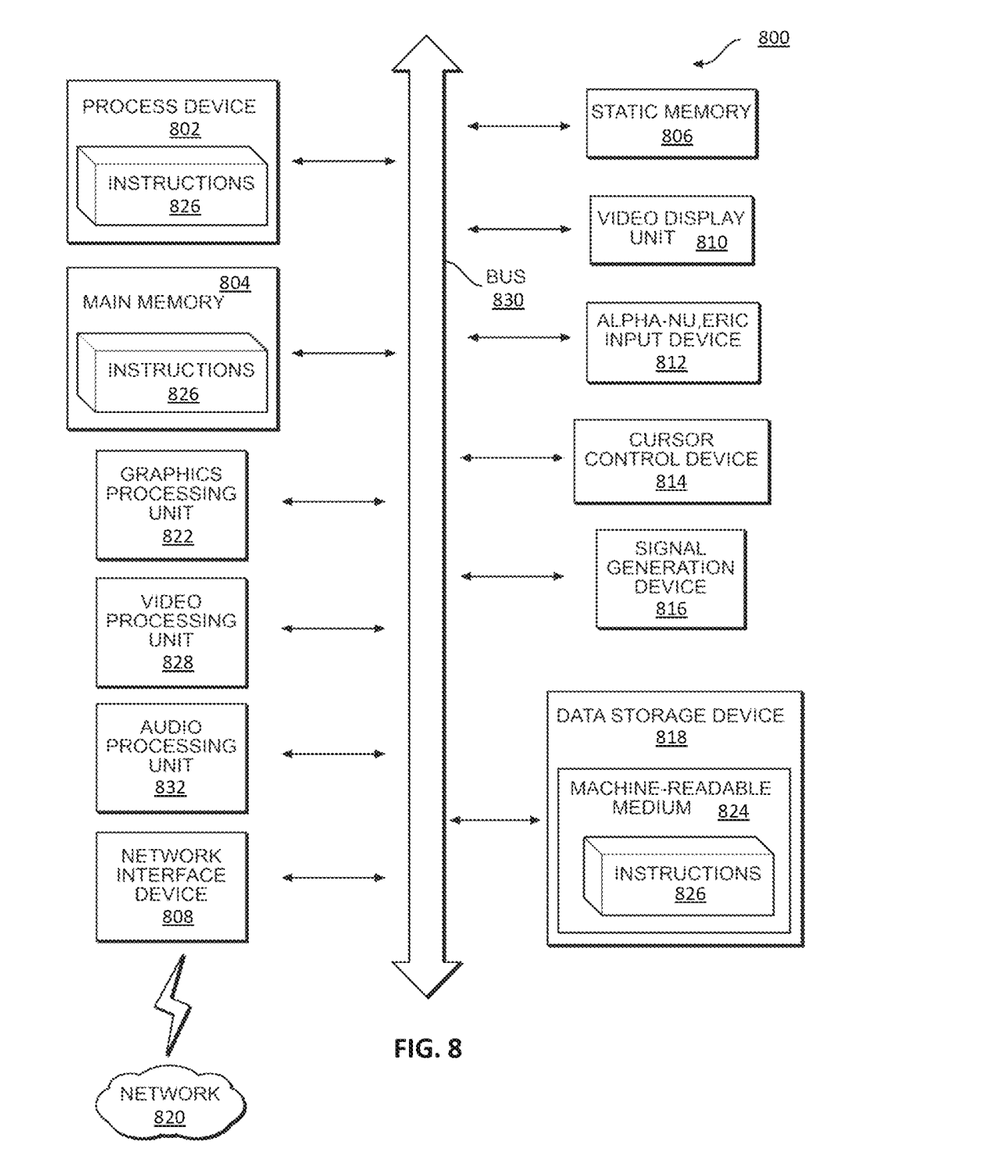
FIG. 8 is a diagram illustrating an exemplary environment in which some embodiments may operate.

FIG. 8 illustrates an example machine of a computer system within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a data storage device 818, which communicate with each other via a bus 830.

Processing device 802 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 is configured to execute instructions 826 for performing the operations and steps discussed herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a computer-readable medium) on which is stored one or more sets of instructions or software 826 embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In one implementation, the instructions 826 include instructions to implement functionality corresponding to the components of a device to perform the disclosure herein. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A computer-implemented method, comprising:
   receiving a pre-attack state of a first instance of an application in response to an action by an attack source;
   selecting one or more security hardening passes to be applied to the pre-attack state; and
   sending an identification of the selected security hardening passes to be applied to a second instance of the application running at the pre-attack state,
   wherein selecting one or more security hardening passes to be applied to the pre-attack state comprises:
      selecting a first security hardening pass associated with a first type of program efficiency benchmark;
      applying the first security hardening pass to the pre-attack state; and
      validating the pre-attack state with the first security hardening pass satisfies a first application performance threshold that corresponds with the first type of program efficiency benchmark.

2. The computer-implemented method of claim 1, further comprising:
   based on satisfying the first application performance threshold:
      selecting a second security hardening passes associated with a second type of program efficiency benchmark, the second type of program efficiency benchmark being different than the first type of program efficiency benchmark;
      applying the second security hardening pass to the pre-attack state with the first security hardening pass; and
      validating the pre-attack state with the first and second security hardening passes satisfies a second application performance threshold that corresponds with the first and the second types of program efficiency benchmarks.

3. The computer-implemented method of claim 1, wherein receiving a pre-attack state of a first instance of an application in response to an action by an attack source comprises:
   receiving an indication of a detected memory access violation of memory used by a first process for the first instance of the application.

4. The computer-implemented method of claim 3, wherein receiving an indication of a detected memory access violation of memory used by a first process comprises:
   receiving an indication of a detected memory access violation of diversified memory used by the first process, the memory access violation detected by a parent process of the first process.

5. The computer-implemented method of claim 4, wherein a second process for the second instance of the application running at the pre-attack state comprises a child process of the parent process; and
   wherein sending an identification of the selected security hardening passes to be applied to a second instance of the application running at the pre-attack state comprises:
      sending the identification of the selected security hardening passes to be applied to the second process by the parent process, the second process running idle at the pre-attack state while the first process fails due to the attack source.

6. The computer-implemented method of claim 4, wherein the parent process diversified the memory used by the first process prior to the memory access violation.

7. A system comprising one or more processors, and a non-transitory computer-readable medium including one or more sequences of instructions that, when executed by the one or more processors, cause the system to perform operations comprising:
   receiving a pre-attack state of a first instance of an application in response to an action by an attack source;
   selecting one or more security hardening passes to be applied to the pre-attack state; and
   sending an identification of the selected security hardening passes to be applied to a second instance of the application running at the pre-attack state,
   wherein selecting one or more security hardening passes to be applied to the pre-attack state comprises:
      selecting a first security hardening pass associated with a first type of program efficiency benchmark;
      applying the first security hardening pass to the pre-attack state; and
      validating the pre-attack state with the first security hardening pass satisfies a first application performance threshold that corresponds with the first type of program efficiency benchmark.

8. The system of claim 7, further comprising:
   based on satisfying the first application performance threshold:
      selecting a second security hardening passes associated with a second type of program efficiency benchmark, the second type of program efficiency benchmark being different than the first type of program efficiency benchmark;
      applying the second security hardening pass to the pre-attack state with the first security hardening pass; and
      validating the pre-attack state with the first and second security hardening passes satisfies a second application performance threshold that corresponds with the first and the second types of program efficiency benchmarks.

9. The system of claim 7, wherein receiving a pre-attack state of a first instance of an application in response to an action by an attack source comprises:
   receiving an indication of a detected memory access violation of memory used by a first process for the first instance of the application.

10. The system of claim 9, wherein receiving an indication of a detected memory access violation of memory used by a first process comprises:
    receiving an indication of a detected memory access violation of diversified memory used by the first process, the memory access violation detected by a parent process of the first process.

11. The system of claim 10, wherein a second process for the second instance of the application running at the pre-attack state comprises a child process of the parent process; and wherein sending an identification of the selected security hardening passes to be applied to a second instance of the application running at the pre-attack state comprises:

sending the identification of the selected security hardening passes to be applied to the second process by the parent process, the second process running idle at the pre-attack state while the first process fails due to the attack source.

12. The system of claim 10, wherein the parent process diversified the memory used by the first process prior to the memory access violation.

13. A computer program product comprising a non-transitory computer-readable medium having a computer-readable program code embodied therein to be executed by one or more processors, the program code including instructions to:

receiving a pre-attack state of a first instance of an application in response to an action by an attack source;

selecting one or more security hardening passes to be applied to the pre-attack state; and sending an identification of the selected security hardening passes to be applied to a second instance of the application running at the pre-attack state, wherein selecting one or more security hardening passes to be applied to the pre-attack state comprises:

selecting a first security hardening pass associated with a first type of program efficiency benchmark;

applying the first security hardening pass to the pre-attack state; and validating the pre-attack state with the first security hardening pass satisfies a first application performance threshold that corresponds with the first type of program efficiency benchmark.

14. The computer program product of claim 13, further comprising:

based on satisfying the first application performance threshold:

selecting a second security hardening passes associated with a second type of program efficiency benchmark, the second type of program efficiency benchmark being different than the first type of program efficiency benchmark;

applying the second security hardening pass to the pre-attack state with the first security hardening pass; and validating the pre-attack state with the first and second security hardening passes satisfies a second application performance threshold that corresponds with the first and the second types of program efficiency benchmarks.

15. The computer program product of claim 13, wherein receiving a pre-attack state of a first instance of an application in response to an action by an attack source comprises:

receiving an indication of a detected memory access violation of memory used by a first process for the first instance of the application.

16. The computer program product of claim 15, wherein receiving an indication of a detected memory access violation of memory used by a first process comprises:

receiving an indication of a detected memory access violation of diversified memory used by the first process, the memory access violation detected by a parent process of the first process.

17. The computer program product of claim 16, wherein a second process for the second instance of the application running at the pre-attack state comprises a child process of the parent process; and wherein sending an identification of the selected security hardening passes to be applied to a second instance of the application running at the pre-attack state comprises:

sending the identification of the selected security hardening passes to be applied to the second process by the parent process, the second process running idle at the pre-attack state while the first process fails due to the attack source, wherein the parent process diversified the memory used by the first process prior to the memory access violation.

* * * * *